July 7, 1942.  J. H. HAMMOND, JR  2,288,802
SIGNALING SYSTEM
Filed Feb. 21, 1939    8 Sheets-Sheet 3

Fig. 4.

INVENTOR
JOHN HAYS HAMMOND, JR.
BY
ATTORNEY

INVENTOR
JOHN HAYS HAMMOND, JR.
BY
ATTORNEY

July 7, 1942.    J. H. HAMMOND, JR    2,288,802
SIGNALING SYSTEM
Filed Feb. 21, 1939    8 Sheets-Sheet 6

INVENTOR
JOHN HAYS HAMMOND, JR.
BY
ATTORNEY

INVENTOR
JOHN HAYS HAMMOND, JR.

Patented July 7, 1942

2,288,802

UNITED STATES PATENT OFFICE 2,288,802

SIGNALING SYSTEM

John Hays Hammond, Jr., Gloucester, Mass., assignor to Radio Corporation of America, New York, N. Y., a corporation of Delaware Application February 21, 1939, Serial No. 257,579

18 Claims. (Cl. 250—10)

This invention relates to a system of radio transmission and has for an object to provide a novel and improved system of the above type having a high degree of privacy and selectivity.

Other objects and advantages will be apparent as the nature of the invention is more fully disclosed.

The invention provides for the use of a carrier wave of suitable frequency which is transmitted in two substantially independent channels. In one embodiment the channels are made independent by the use of plane polarized waves with the planes of polarization substantially at right angles to each other. The carrier waves may be modulated by the same signal frequency, but with a predetermined phase relationship between the two modulations. Signaling may be accomplished by changing the relative phase displacement of the modulations, by changing the frequency of the modulations, by changing the amplitude of the modulations, by changing both the phase displacement and the frequency of the modulations, or by any combination of the above.

Another object is accordingly to provide novel and improved transmitting and receiving systems for the above purpose.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization, may be better understood by referring to the following description, taken in connecion with the accompanying drawings forming a part thereof, in which

Like reference characters denote like parts in the several figures of the drawings.

Certain parts are identified herein by specific names for convenience of description only and not as a limitation on the scope of the invention.

Figure 1:
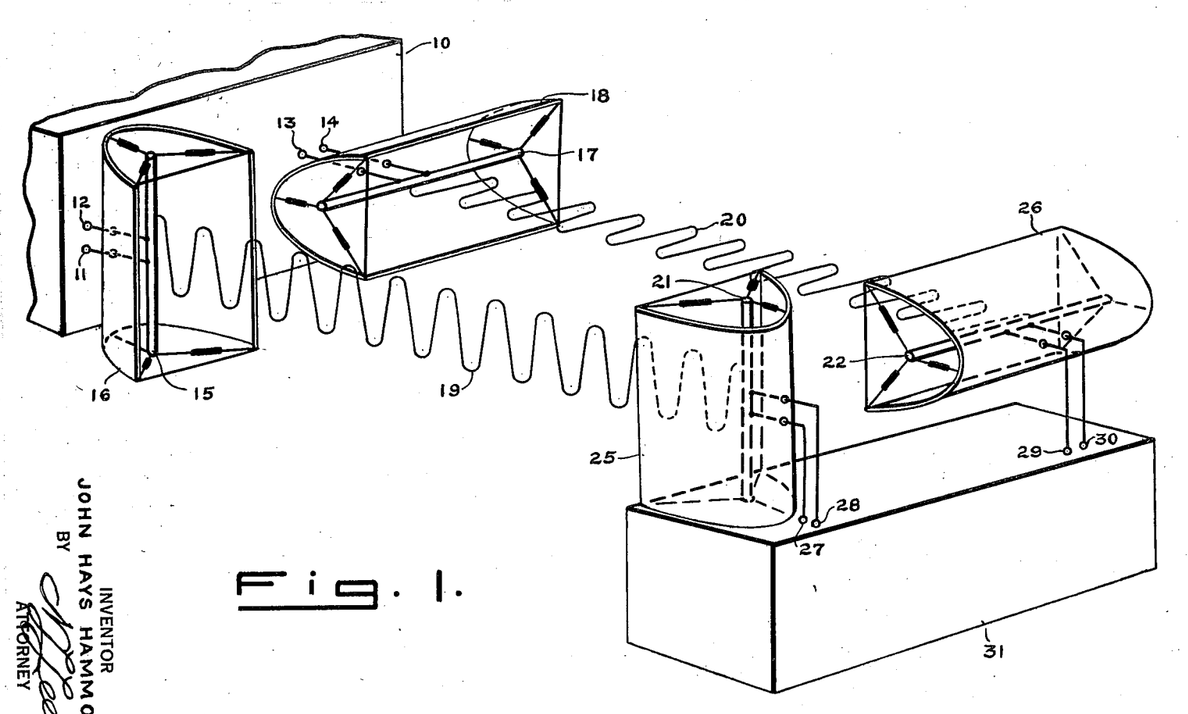
Fig. 1 illustrates diagrammatically one embodiment of the invention as applied to a transmitting and receiving system for polarized waves.

Referring to the accompanying drawings, and more particularly to Fig. 1, a transmitter 10 is shown having output terminals 11, 12 and 13, 14. The terminals 11 and 12 are connected to a vertical radiator consisting of a rod 15 which is mounted in but insulated from a reflector 16. The terminals 13 and 14 are connected to a horizontal radiator consisting of a rod 17 which is mounted in but insulated from a reflector 18. The reflectors 16 and 18 may be of any suitable type, but are preferably of parabolic section and have the rods 15 and 17 located at the foci of these parabolas. The radiators 15 and 17 are adapted to send out substantially plane polarized radiations which are polarized at right angles to each other and have directive properties. It is to be understood that any suitable type of radiators may be used which produce radiations having such polarized and directional properties.

The energy produced at the terminals 11 and 12 is utilized to drive the vertical radiator 15, which produces a substantially vertically polarized wave shown diagrammatically by the sinusoidal line 19. The energy produced at the terminals 13 and 14 is utilized to drive the horizontal radiator 17 which produces a substantially horizontally polarized wave shown diagrammatically by the sinusoidal line 20.

The radiations 19 and 20 are both directed to a receiving system comprising a vertical rod 21 and a horizontal rod 22 for receiving the radiations 19 and 20 respectively. The rods 21 and 22 are preferably mounted at the foci of two parabolic reflectors 25 and 26 and are connected to two sets of terminals 27, 28 and 29, 30 associated with a receiver 31. Due to the polarized nature of the transmitting and receiving antennas the receiver terminals 27 and 28 are actuated by energy produced at the transmitter terminals 11 and 12 and the receiver terminals 29 and 30 are actuated by energy produced at the transmitter terminals 13 and 14. It is to be understood that while energy from the vertical radiator 15 will impinge on the horizontal receiving antenna 22 and energy from the horizontal radiator 17 will impinge on the vertical receiving antenna 21 these energies will not be absorbed by these receiving systems. The above system is representative only. Any suitable type of polarized transmitting and receiving means may be used for propagating and receiving plane polarized waves.

Figures 2, 3:
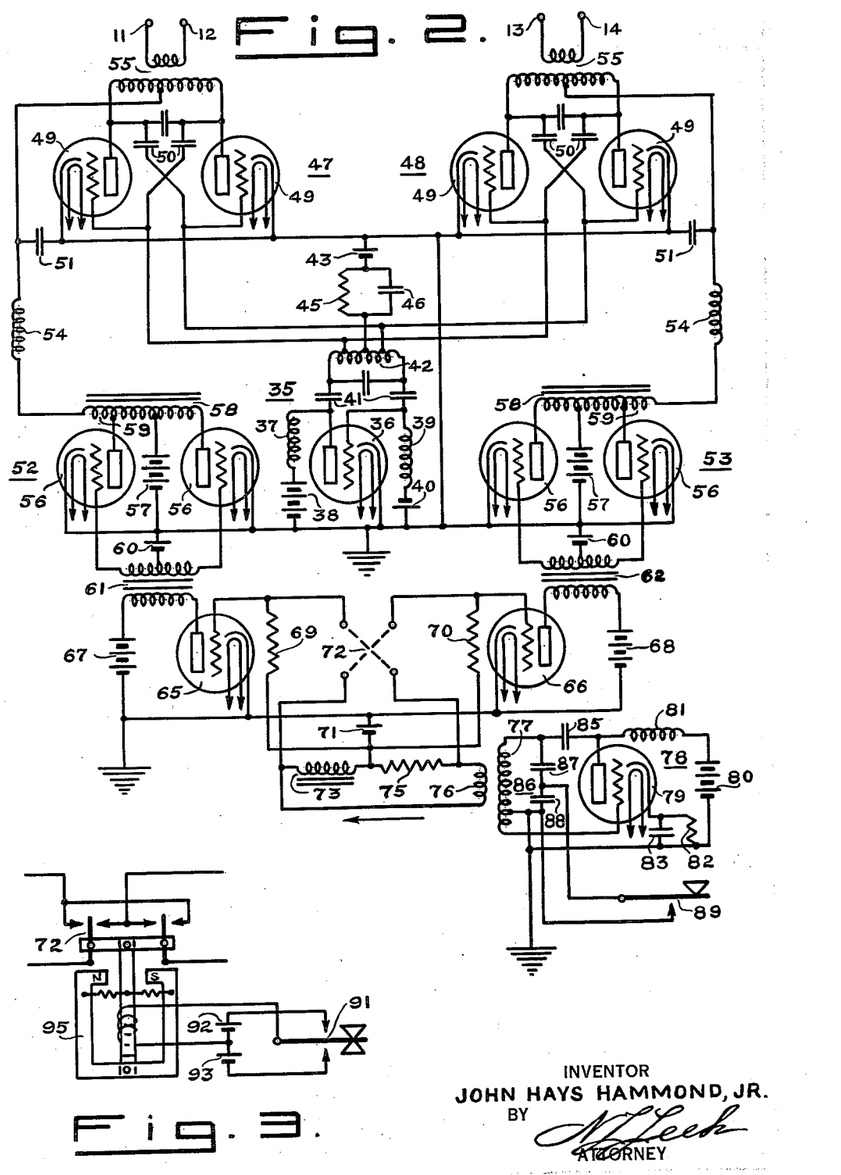
Fig. 2 illustrates schematically a transmitter using conventional amplitude modulation with signaling by change of modulation frequency.
Fig. 3 shows a modification of the transmitter illustrated in Fig. 2, which permits signaling by change of phase relationship with or without change of modulating frequency.

Referring to Fig. 2 a transmitter circuit is shown which may be used for producing the energy to excite the two radiators 15 and 17 shown in Fig. 1. In the circuit shown in Fig. 2 a source of carrier energy 35 is provided which comprises a triode tube 36 having a plate choke 37 and battery 38 and a grid choke 39 and battery 40. Coupled to the tube electrodes by means of blocking condenser 41 is a tank circuit 42. The center tap of the tank circuit 42 is connected to ground through a battery 43 and a resistor 45 and a condenser 46.

The tank circuit 42 is connected to two power amplifiers 47 and 48 which are of the push pull type, each having two triode tubes 49 which are neutralized against self oscillation by condensers 50. Grid excitation is provided from the tank circuit 42 and the plate circuit is energized from D. C. and A. C. voltage across filtering by-pass condensers 51 fed from modulators 52 and 53 through chokes 54. The output circuits of the power amplifiers 47 and 48 are connected through transformers 55 to the output terminals 11, 12 and 13, 14 respectively.

The modulators 52 and 53 are shown as of the push-pull type each comprising two triode tubes 56 and a plate battery 57 which serves the tubes 56 as well as the tubes 49 of the power amplifiers 47 and 48. The modulators 52 and 53 are each provided with an output auto transformer 58 with step-up taps 59 to supply the A. C. modulating voltage to the tubes 49.

The tubes 56 may be grid biased by batteries 60 and may be driven from the secondaries of transformers 61 and 62, the primaries of which are included in the plate circuits of triode tubes 65 and 66 respectively which also include batteries 67 and 68. The grids of the tubes 65 and 66 are connected through resistors 69 and 70 respectively and a battery 71 to ground. The grids of the tubes 65 and 66 are also connected through a reversing switch 72 and an inductor 73 and resistor 75 to the battery 71. The inductor 73 and resistor 75 are of low impedance in comparison with the resistors 69 and 70 and the input impedance of the tubes 65 and 66, and of substantially equal impedance at the mean of the two possible frequencies of modulation.

Connected in series with the inductor 73 and resistor 75 is a coil 76 which is inductively coupled to a coil 77 forming part of an oscillator 78. The oscillator 78 comprises a triode tube 79, a plate battery 80, a choke 81, a cathode resistor 82 and a condenser 83. The output circuit of the oscillator 78 includes a blocking condenser 85 and a tank circuit 86, which comprises the coil 77 and condensers 87 and 88. The grid of the tube 79 is connected to an extension of the tank circuit winding. A key 89 is connected across the condenser 88, the capacity of which is many times the capacity of the condenser 87.

In the operation of the transmitter shown in Fig. 2 the oscillator 35 produces high frequency oscillations which are fed to the two power amplifiers 47 and 48 where the energy is amplified and modulated by energy fed from the modulators 52 and 53, the frequency of this modulating energy being determined by the frequency of the oscillations produced by the oscillator 78.

The relative phasing or timing of the modulations is determined by the position of the reversing switch 72. Assume that zero degrees reference phase is at the time when the current from the coupling coil 76 is at a positive maximum flowing in the direction of the arrow. Assume that the switch 72 is thrown so that the inductor 73 is in parallel with the high impedance resistor 69 and the high input impedance of the tube 65 and that the resistor 75 is in parallel with the high impedance resistor 70 and the high input impedance of the tube 66. The phase of the voltage on the grid of the tube 65 then leads the current by substantially 90 electrical degrees and at the instant that the phase of the current is 0° the phase of the grid voltage will be substantially +90°.

The current from the coupling coil 76 enters the inductor 73 at the grid end and enters the resistor at the ground end and therefore the voltage on the grid of the tube 66 is in phase opposition with the current so that at the instant the phase of the current is 0° the phase of the voltage on the grid of the tube 66 will be ±180°. As the phase of the voltage on the grid of tube 65 is substantially at +90° it may be considered to lag behind the voltage on the grid of the tube 66 by substantially 90 electrical degrees.

If the switch 72 is thrown into the reversed position the inductor 73 will be thrown in parallel with the resistor 70 and the resistor 75 will be thrown in parallel with the resistor 69. Under these conditions the voltage on the grid of the tube 65 will lead the voltage on the grid of the tube 66 by substantially 90 electrical degrees.

The substantially 90° difference of phase is carried through the modulating systems and, by suitably choosing the directions of transformer windings and other electrical connections, will appear at the output terminals 11—12 and 13—14. With the switch 72 in the first position the modulations of the radio energy at the terminals 11—12 will lag behind that at the terminals 13—14 by substantially 90 electrical degrees and with the switch 72 in the reversed position it will lead by substantially 90 electrical degrees. The relative phases of the high frequency carrier waves are unimportant in either case.

The key 89 may be used for changing the modulation frequency of the oscillator 78 by short circuiting the condenser 88, so that when the key 89 is closed the modulation frequency will be somewhat lower than when the key is open.

Fig. 3 depicts a modification of the circuits shown in Fig. 2 so that the switch 72 may be key operated. In this modified form a key 91 is provided with upper and lower contacts which are connected through oppositely polarized batteries 92 and 93 to one side of the armature winding of a polarized relay 95 the other side of which is connected to the movable arm of the key 91. The armature of the relay 95 is connected to the reversing switch 72.

In the operation of the modified form of the invention shown in Fig. 3 when the key 91 is depressed a circuit will be closed from the battery 93 through the winding of the armature of the polarized relay 95, thus causing this armature to be moved to the right, which in turn throws the reversing switch 72 to the right. This, as already described, causes the modulations at the terminals 11 and 12 to lead the modulations at the terminals 13 and 14 by 90 electrical degrees. When the key 91 is elevated the battery 92 will be thrown in circuit with the armature winding thus reversing the current flowing through the armature winding and causing the armature of the polarized relay 95 to be moved to the left. This will cause the reversing switch 72 to be thrown to the left, which as already described causes the modulations at the terminals 11 and 12 to lag behind the modulations at the terminals 13 and 14 by 90 electrical degrees.

When the key 91 is in the neutral position no current will flow through the armature winding of the polarized relay 95 and the reversing switch 72 will be held in a neutral position as shown in Fig. 3, so that no modulations will be produced. It is to be understood that an arrangement may be used in which the relative phase relations of the modulations may be continuously shifted without discontinuity, such for example as that shown in Fig. 5 of my copending application 241,894 which shows a coil rotated by a key in the field of two inductances carrying currents in relative phase quadrature. The shift thus obtained may be other than 90°.

Figure 4:
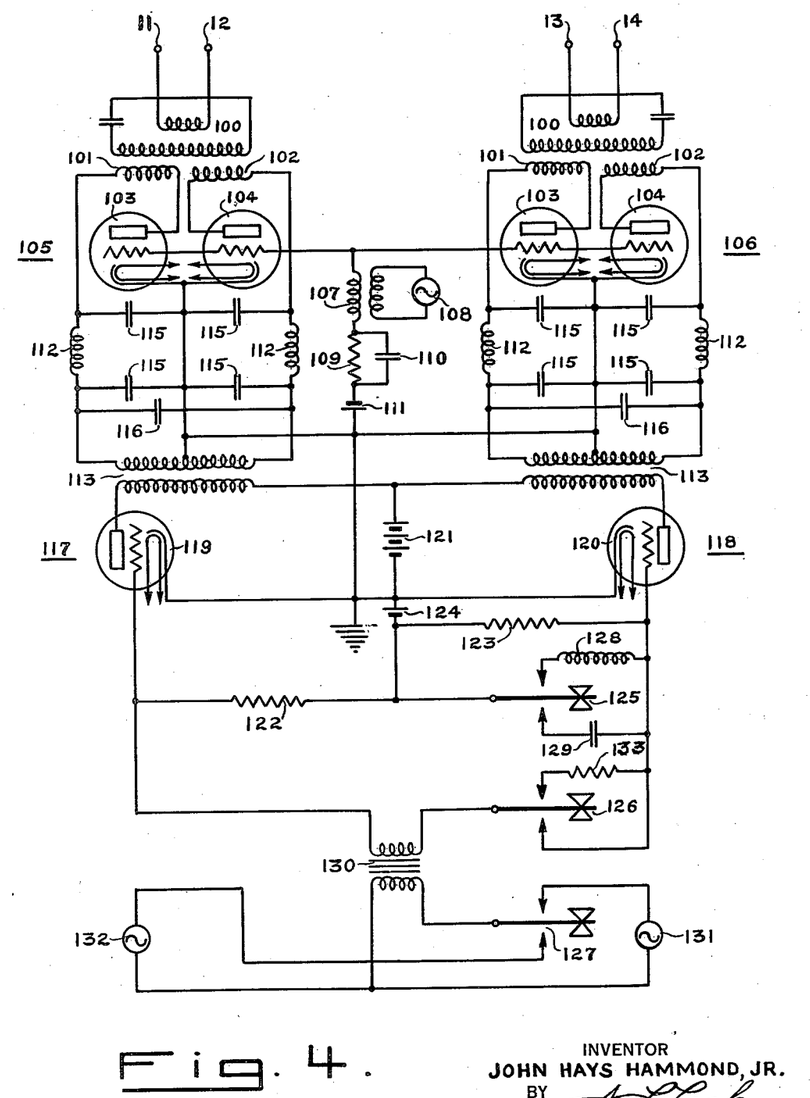
Fig. 4 shows schematically the circuits of a transmitter using push-pull type of modulation with provisions for keying in various manners.

In Fig. 4 is shown a type of transmitter in which the carrier wave is eliminated and the side bands only are radiated. In this case the radiations may be described as plane polarized radio waves, with the plane of polarization continuously rotating in accordance with the rate of modulation, that is, the vertical radiations from the radiator 15 (Fig. 1) and the horizontal radiations from the radiator 17, at a distance $x$ along the line of transmission, would be of the nature:

$$E_v = A_x \sin (pt + \theta_x) \cos (\omega t + \phi_x)$$
$$E_\eta = A_x \cos (pt + \theta_x) \cos (\omega t + \phi_x)$$

in which $p$ and $\omega$ refer to modulation and radio frequencies. $A_x$ is an amplitude function of $x$ and $\theta_x$ and $\phi_x$ are phase functions of $x$.

These radiations are equivalent to a single radiation of amplitude $A_x$, but with the plane of polarization rotating at a rate determined by the frequency of modulation employed. The radiations from this type of transmitter may be more simply described than those from the transmitter shown in Fig. 2 and are readily compared with the circularly polarized radiations described in my copending application Serial No. 241,894 already referred to. It is to be understood, however, that the same general results are to be obtained from the circuits shown in Fig. 2 as from the circuits depicted in Fig. 4 with the difference that the demodulated tone in the receiver, used in connection with the transmitter shown in Fig. 4, will have a frequency double the modulation frequency used at the transmitter.

Referring to Fig. 4 the output terminals 11, 12 and 13, 14 are each connected to a tank circuit 100 each of which is coupled to two coils 101 and 102 which are wound in opposite sense and which are connected in the plate circuits of two sets of tubes 103 and 104 which form radio frequency power amplifiers 105 and 106. The couplings 101 and 102 from the tubes to the tank circuits are such that equal currents simultaneously flowing to the plates of both tubes 103 and 104 will produce no net current in the tank circuit 100. The grids of the tubes 103 and 104 are connected through a transformer 107 to a source of radio frequency energy 108 and by a grid leak 109, a condenser 110 and a grid biasing battery 111 to ground.

The coils 101 and 102 are connected through radio frequency chokes 112 to the secondaries of transformers 113. Condensers 115 are connected from the chokes 112 to ground to form, with these chokes, radio frequency filters. Condensers 116 may be connected across the secondaries of the transformers 113. The primaries of the transformers 113 are connected in the output circuits of modulators 117 and 118, which comprise relatively high power amplifier tubes 119 and 120 driven from a battery 121. The grids of the tubes 119 and 120 are connected through resistors 122 and 123 to the negative side of a bias battery 124 the other side of which is grounded.

For controlling frequency, amplitude and phase, three double acting keys 125, 126 and 127 are provided. The key 125 is connected to the negative side of the biasing battery 124. The upper contact is connected through an inductor 128 and the lower contact through a condenser 129 to the grid of the tube 120. The key 126 is connected through the secondary of a transformer 130 to the grid of the tube 119. Its upper contact is connected through a resistor 133 to the grid of the tube 120 and the lower contact is connected directly to the grid of the tube 120. The key 127 is connected to one side of the primary of the transformer 130. The upper contact is connected to an oscillator 131 and the lower contact to an oscillator 132, both of which may be of any well known design.

In the operation of the transmitter shown in Fig. 4 the grids of the tubes 103 and 104 are excited in phase from the radio frequency source 108 and the plate power is derived entirely from the output of the modulators 117 and 118. Each of the tubes 103 and 104 operate during only one half of the modulation cycle, the tubes 103 during one half and the tubes 104 during the other half, since a tube can amplify only when the plate supply voltage is positive. When the plate supply voltage of the tubes 103 is positive the grid voltage of these tubes is amplified and the output energy is fed through the coils 101 to the output tank circuits 100. When the plate supply voltage of the tubes 104 is positive the grid voltage of these tubes is amplified and the output energy is fed through the coils 102 to the output tank circuits 100.

The relative senses of the couplings 101 and 102 must be correctly chosen so that the output formula will approximate $\sin pt \cos \omega t$, which represents the desired wave with first order side bands only. It has been found by experiment that this type of modulating system will produce the desired wave form with considerable accuracy.

In the operation of the keys 125, 126 and 127 the key 125 is used for phase control, the key 126 for amplitude control and the key 127 for frequency control. With the key 127 down the oscillator 132 is thrown in circuit and with the key 127 up the oscillator 131 is thrown in circuit. If the key 127 is locked in the down position and the key 126 is then depressed, with the key 125 in neutral, the modulator tubes 119 and 120 will be unequally excited in phase at the frequency of the oscillator 132. If the key 127 is locked in the up position the modulating frequency will be that of the oscillator 131.

When the key 125 is depressed the condenser 129 will be in circuit across the resistor 123 so that the voltage to the tube 120 will lead the voltage to the tube 119 by 90 electrical degrees. When the key 125 is elevated the inductor 128 will be in circuit and the voltage to the tube 120 will lag behind the voltage to the tube 119 by 90 electrical degrees. The elements 122, 123, 128 and 129 may be so chosen that with the key 125 up or down respectively the voltages to the two tubes 119 and 120 will be equal but in phase quadrature. When the key 126 is elevated the resistor 133 will be thrown in the output circuit of the transformer 130 thus decreasing the energy fed to the modulator tubes 119 and 120 and thereby decreasing strength of signal.

It is thus seen that there are a number of possible combinations for keying. With the keys 126 and 127 locked down the key 125 may be used for shifting the phase of the full strength modulation produced by the oscillator 132. With the keys 126 and 127 locked up the key 125 may be used for shifting the phase of the decreased strength signal delivered by the oscillator 131. With one key locked up and the other down different combinations may be produced. With the keys 125 and 127 locked in various positions amplitude keying may be accomplished by operating the key 126. With the keys 125 and 126 locked in various positions frequency keying may be accomplished by operating the key 127. This arrangement permits the radiations from the antennas 15 and 17 to be varied in frequency, strength and relative phase of modulation.

By combinations of keying, special telegraphic codes may be made up utilizing their different effects on the nature of the radiations. While usually the relative change of phase will be 180°, from 90° leading to 90° lagging, it is possible to use smaller changes of modulation phase, as specially constructed receivers could be made responsive to much smaller changes of phase, frequency or amplitude and the code system rendered highly free from unauthorized interception.

Figure 5:
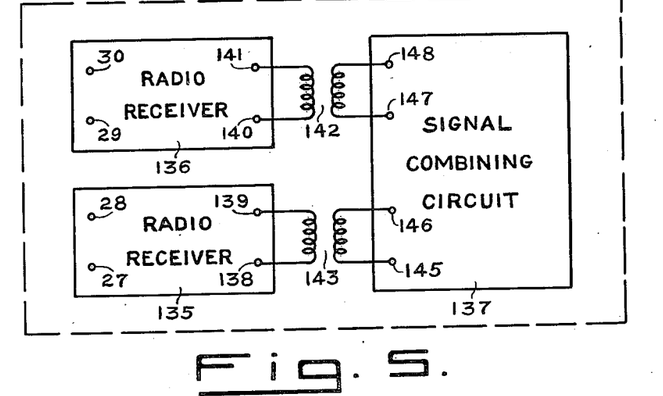
Fig. 5 shows the general arrangement of a receiver.

Fig. 5 illustrates the general arrangement of a receiver designed to work in conjunction with the types of transmitters depicted in Figs. 2, 3 and 4. In this receiver two independent radio tuners and detectors 135 and 136 designated as "radio receivers" are required to demodulate the incoming signals independently. A signal combining circuit 137 is required to determine the relative phases of the demodulated signal and to record or indicate the changes of frequency or amplitude when desired.

The radio receivers 135 and 136 are provided with input terminals 27, 28 and 29, 30 which may be connected to the vertical and horizontal receiving antennas 21 and 22 respectively, as shown in Fig. 1. The radio receivers 135 and 136 are provided with output terminals 138, 139 and 140, 141 respectively, which may be connected through transformers 142 and 143 respectively to input terminals 145, 146 and input terminals 147, 148 of the signal combining circuit 137.

Figure 6:
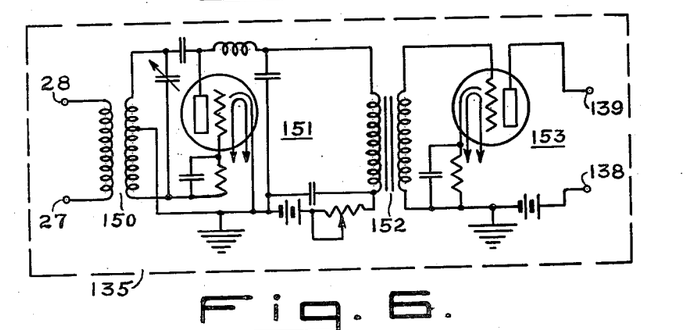
Figs. 6 and 7 show schematically the circuits of two radio receivers which may be employed in the receiver illustrated in Fig. 5.

Fig. 6 illustrates a regenerative type of radio receiver which may be used in the receivers shown in Fig. 5. In this type of radio receiver the input terminals 27 and 28 are connected through a transformer 150 to a detector 151 of any standard type, the output circuit of which is connected through a second transformer 152 to a stage of amplification 153. The output circuit of this amplifier may be connected to the output terminals 138 and 139.

Figure 7:
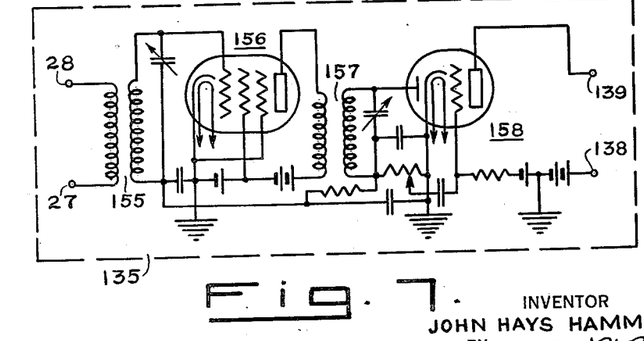

In Fig. 7 is depicted another type of circuit which may be used as the radio receivers of Fig. 5. In this circuit the input terminals 27 and 28 are connected through a transformer 155 to a radio frequency amplifier 156 of any standard type, the output circuit of which is connected through a transformer 157 to a linear rectifier amplifier 158. The output circuit of the amplifier 158 may be connected to the output terminals 138 and 139.

The details of construction and the operation of the radio receivers shown in Figs. 6 and 7 are well known in the art and need not be more fully described herein. The amplifiers may, of course, comprise one or more stages. The receiver illustrated in Fig. 6 may be used for ultra high frequencies while that depicted in Fig. 7 may be used for lower frequencies.

Figure 8:
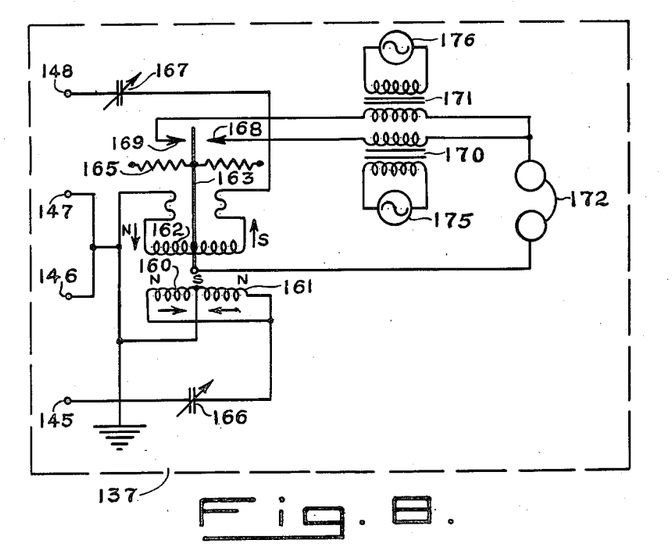
Fig. 8 illustrates schematically the circuits of a combining circuit which may be employed in the receiver shown in Fig. 5 when the signaling is by change of phase of modulation.

Fig. 8 illustrates one form of signal combining circuit 137 which may be used for receiving signals of fixed frequency of modulation but varied in relative phase and is based on the operation of a phase operated relay similar to a dynamometer type voltmeter. In this circuit the input terminals 145 and 146 are connected to fixed coils 160 and 161 in such a manner that current flows through these coils in opposite directions as shown by the arrows, so that when it produces north poles at the ends of these coils, it simultaneously produces south poles at the center, as designated by the letters N and S. The input terminals 147 and 148 are connected to a movable coil 162 which is mounted on a contact arm 163 normally held in a central position by springs 165. The winding of the coil 162 is continuous so that when a north pole is formed at one end, a south pole is formed at the other end and vice versa. Variable condensers 166 and 167 are connected in the circuits of the coils 160—161 and 162. Mounted adjacent to the movable arm 163 are two contacts 168 and 169, which are connected through the secondaries of transformers 170 and 171 respectively to a pair of head phones 172 the other side of which is connected to the contact arm 163. The primaries of the transformers 170 and 171 are connected to tone sources 175 and 176 respectively which produce audio tones of different frequencies.

In the operation of the circuit shown in Fig. 8 signals may be sent by operating either the reversing switch 72 of Fig. 2 or the key 91 of Fig. 3, the key 89, however, being kept in a fixed position. In this case the received signals across the terminals 145, 146 and 147, 148 would be of fixed frequency but of different phase. In such a device the torque between the two coils is given by the formula, $$\text{Torque} = A\, I_1 I_2 \cos \theta$$

where $\theta$ is the phase difference between the currents $I_1$ and $I_2$. For $\theta = \pm 90°$ there is no torque and the movable coil 162 will remain in a central position under the action of the springs 165. For $\theta = 0°$ the torque is a positive maximum and the movable coil will be rotated in a clockwise direction, for example. For $\theta = 180°$ the torque is a negative maximum and the movable coil will be rotated in a counter clockwise direction.

It is evident that if the input terminals 145, 146 and 147, 148 were similarly loaded, the voltages at these terminals and therefore the currents through them would be in quadrature in one sense or the other, e. i. one would lead or lag behind the other by 90 electrical degrees.

In order to bring the currents to substantially zero or 180 electrical degrees phase difference the variable condensers 166 and 167 are operated to shift the phases, by bringing the respective circuits nearly into resonance. One circuit is thus tuned above resonance and the other below resonance thereby shifting the phases of the currents with respect to supply voltages by 45 degrees in different senses so that the coils 160—161 and 162 react on each other positively or negatively. Assume for example that the potential of terminal 145 with respect to the terminal 146 lags behind the potential of terminal 147 with respect to the terminal 148. By adjusting condenser 166 the fixed coil circuit may be tuned below resonance to give 45 degrees capacitive loading thus advancing the current in this circuit by 45 electrical degrees. By adjusting the condenser 167 the movable coil circuit is tuned above resonance to give 45 degrees inductive loading, thus retarding the current in this circuit by 45 electrical degrees. In this case the currents in the two sets of coils 160—161 and 162 will be suitably related in phase to make the poles of the windings simultaneously an instantaneous maximum, for example as indicated by the letters N and S. This will produce a torque in a clockwise direction at all instants of the modulation cycle which will cause the arm 163 to move to the right into engagement with the contact 168.

If the switch 72 of Fig. 2 is reversed the phases of the potentials at the terminals 145—146 and 147—148 are shifted relatively by 180 electrical degrees, so that the corresponding currents through the coils will be relatively reversed, thus causing the movable coil 162 to be rotated in a counter clockwise direction which will cause the arm 163 to engage the contact 169.

When the arm 163 engages either the contact 168 or the contact 169 a circuit will be closed to supply energy from either the tonal source 175 or the tonal source 176 to the head phones 172. In this way a different tone will be heard in the head phones 172 depending on whether the voltage applied to the terminals 145—146 leads or lags behind the voltage applied to the terminals 147—148. This in turn depends upon the position of the reversing switch 72 of Fig. 2 or the position of the key 91 of Fig. 3, so that, for example, standard continental telegraphic code may be used. With the key 91 down a dot would be indicated by a lower tone in the head phones 172 from the source 175 and with the key 91 up a dash would be indicated by a higher tone from the source 176. The system could also be used for facsimile control and other purposes.

Figure 9:
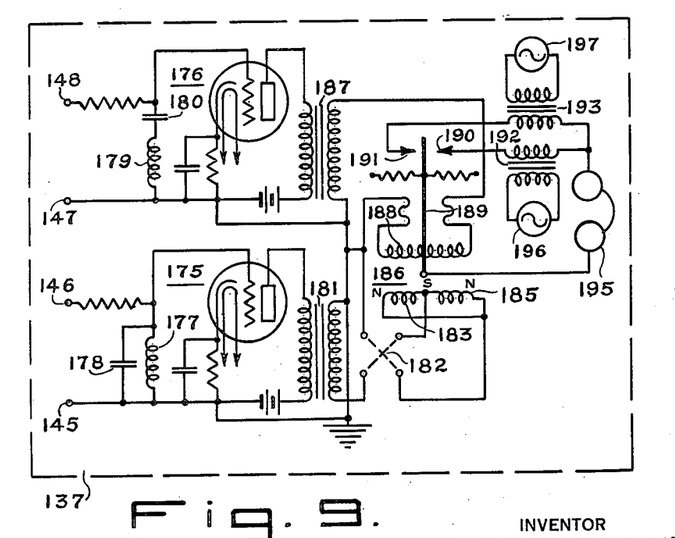
Fig. 9 shows a combining circuit for use when the signaling is by change of frequency of modulation.

In Fig. 9 is illustrated a modified form of signal combining circuit 137 in which the input terminals 145, 146 and 147, 148 are connected to two phase shifting amplifiers 175 and 176. Bridged across the input circuit of the amplifier 175 is an inductance 177 and a condenser 178 in parallel and bridged across the input circuit of the amplifier 176 is an inductance 179 and a condenser 180 in series. The output circuit of the amplifier 175 is connected through a transformer 181 and a reversing switch 182 to the fixed coils 183 and 185 of a phase operated relay 186. The output circuit of the amplifier 176 is connected through a transformer 187 to the movable coil 188 of the relay 186. The relay 186 is provided with a contact arm 189 which cooperates with contacts 190 and 191. These contacts are connected through the secondaries of transformers 192 and 193 respectively to a pair of head phones 195 the other side of which is connected to the arm 189. The primaries of the transformers 192 and 193 are connected to tone sources 196 and 197 respectively which produce tones of different frequencies.

In the operation of the modified form of the invention shown in Fig. 9 the reversing switch 72 of the transmitter depicted in Fig. 2 is fixed in one position or the other and the key 89 is operated to send the signals by varying the frequency of the modulations, as described in connection with Fig. 2. The phase shifting circuits 177—178 of amplifier 175 and the phase shifting circuits 179—180 of amplifier 176 are each tuned to substantially the mean of these two frequencies produced by the oscillator 73. Due to the parallel resonant arrangement of the branch 177—178 and the series resonant arrangement of the branch 179—180, the impedances of these two arms are capacitive and inductive, respectively at higher frequencies, and inductive and capacitive, respectively, at lower frequencies.

With substantially 90 degrees phase difference in the outputs of the two radio receivers 135 and 136 (Fig. 5) the circuits of the amplifiers 175 and 176 may be so adjusted that the outputs of these amplifiers, which are impressed through the transformers 181 and 187 onto the windings of the relay 186, will be substantially in phase or 180° out of phase depending upon the frequency of modulation used in the transmitter. When the currents through the two sets of coils of the relay 186 are in phase the tone produced by the tone source 196 will be heard in the head phones 195, as described in connection with Fig. 8, and when the currents in the coils of the relay 186 are 180° out of phase the tone produced by the tone source 197 will be heard in the phones 195.

The amplifiers 175 and 176 are therefore subjected to oppositely sensed shifts regardless of whether the frequency is high or low with the sense of shift changing on change of frequency. It is evident, therefore, that the tone produced in the head phones may be correlated with the position of the key 89 of Fig. 2 for the purposes of sending telegraphic facsimile or control signals. This correlation would be reversed by throwing the phase reversing switch 72 of Fig. 2 to the other position, but could be corrected for by throwing the reversing switch 182. For further privacy the switches 72 and 182 could be synchronously thrown either by predetermined signals or automatically. The cue for the throwing of the switch 182 could be obtained from the relative phases of the voltages across the grids of the tubes of the amplifiers 175 and 176. With the frequency held constant the system would be responsive to phase modulation as change in relative phase would cause reversal of the relay 185. The system can accordingly be used to receive frequency modulated waves, phase modulated waves or a predetermined combination thereof.

Figure 10:
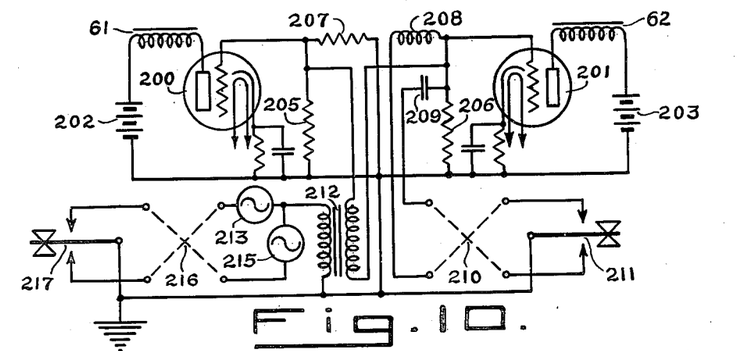
Fig. 10 depicts schematically the circuits of a modification of the transmitter shown in Fig. 2 which provides for signaling by both frequency and phase change.

In Fig. 10 is illustrated a modification of the transmitters shown in Figs. 2 and 4. The primaries of the transformers 61 and 62 of Fig. 2 are shown which could also represent the primaries of the transformers 113 of Fig. 4. The primaries of the transformers 61 and 62 are connected in the output circuits of tubes 200 and 201, which are provided with plate batteries 202 and 203 respectively. The grids of the tubes 200 and 201 are connected through high resistors 205 and 206 to ground. The grid of the tube 200 is connected through a low resistor 207 to ground. The grid of the tube 201 is connected through an inductor 208 and a condenser 209 to one side of a reversing switch 210 the other side of which is connected to the two contacts of a double acting key 211. Connected between the grids of the tubes 200 and 201 is the secondary of a transformer 212, the primary of which is connected through tone sources 213 and 215 to a reversing switch 216. The other side of the reversing switch 216 is connected to the two contacts of a double acting key 217.

In the operation of this form of transmitter, the frequency of modulation is controlled by the key 217. When the key 217 is depressed the frequency of modulation is that of the low tone source 213 and when the key 217 is elevated the frequency of modulation is that of the high tone source 215. When the key 211 is depressed the condenser 209 is shunted across the resistor 206 thus causing the voltage to the tube 201 to lead the voltage to the tube 200 by 90 electrical degrees. When the key 211 is elevated the inductor 208 will be shunted across the resistor 206, thus causing the voltage to the tube 201 to lag behind the voltage to the tube 200 by 90 electrical degrees.

It is to be understood that in the operation of the system one key will be held against a contact while the other key is used for signaling. By throwing the reversing switches 216 and 210 the actions of the keys 217 and 211 may be reversed. The transmitter depicted in Fig. 10 may be used with the signal combining circuit 137 shown in Fig. 9 for sending signals in which the code involves frequency and phase changes. Continental code may be sent by using either key 217 or 211. If either reversing switch 216 or 210 is thrown the reversing switch 182 shown in Fig. 9 must also be thrown to preserve the correlation of the transmitter and the receiver, but if both switches 216 and 210 are thrown the correlation is preserved without throwing the switch 182.

Figure 11:
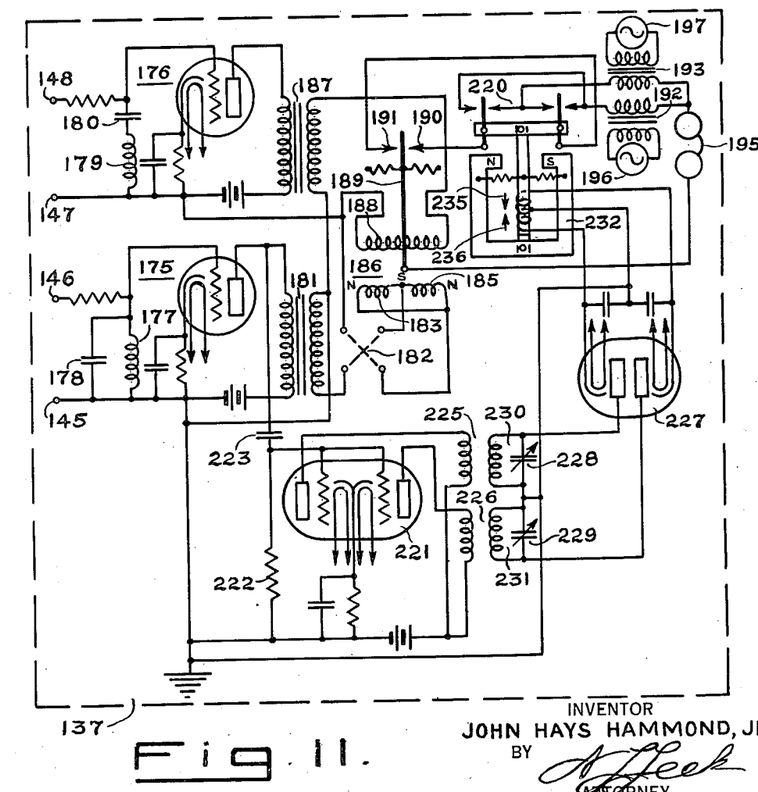
Fig. 11 shows schematically the circuits of a receiver having a combining circuit responsive to phase change only, which is responsive to a transmitter of the type shown in Fig. 10.

Fig. 11 illustrates a modification of the signal combining circuit shown in Fig. 9 in which the receiver indication and the relative phase at the transmitter are properly correlated regardless of the frequency used. It includes a reversing switch which automatically changes position with change of modulation frequency. In this circuit the input terminals 145, 146 and 147, 148 are connected to the two phase shifting amplifiers 175 and 176 the output circuits of which are connected through the two transformers 181 and 187 to the coils of the relay 186. The contacts 190 and 191 of the relay 186 are connected through a reversing switch 220 and secondaries of the two transformers 192 and 193 to the head phones 195.

For operating the reversing switch 220 a double triode tube 221 is provided, the input circuit of which is connected across a resistor 222. The two grids of the tube 221 are connected in parallel through a condenser 223 to the plate of the amplifier tube 175. The two plate circuits of the tube 221 are connected through transformers 225 and 226 respectively to the two plates of a double rectifier tube 227. Variable condensers 228 and 229 are connected across the secondaries of the transformers 225 and 226, forming with these secondaries two tuned circuits 230 and 231, the former being tuned to the higher and the latter to the lower modulating frequency of the tone sources 215 and 213 respectively. The output circuits of the rectifier 227 are connected to the double armature winding of a polarized relay 232, the armature of which is connected to the reversing switch 220.

In the operation of the modified signal combining circuit 137 shown in Fig. 11 the signal indicated in the head phones 195 is dependent upon the throw the key 211 of Fig. 10 regardless of the position of the key 217 which is used for confusing any unauthorized person trying to listen in.

The two phase shifting amplifiers 175 and 176 operate in a similar manner to that described in connection with Fig. 9, so that, for example when the key 217 of the transmitter shown in Fig. 10 is depressed, the signal will be modulated at the frequency of the low tone source 213 and when the key 217 is elevated the signal will be modulated at the frequency of the high tone source 215. By manipulating the key 211 the relative phases of the transmitted signals may be shifted 90 electrical degrees in either sense as already described. The relative phases of the voltages impressed upon the input terminals 145, 146 and 147, 148 of Fig. 11 will therefore depend on the position of the key 211 and not on the position of the key 217. The direction of the operation of the relay 186 will depend on the directions of throw of both keys 211 and 217 on account of the opposite phase shifting effects on the two frequencies produced by the circuits 177—178 and 179—180 as described in connection with Fig. 9.

Some of the output energy from the amplifier 175 will be fed through the condenser 223 to produce a voltage across the resistor 222, which is across the input circuit of the tube 221, thus causing the low frequency energy to be impressed upon this tube. The output energy from the tube 221 will pass through the two transformers 225 and 226 and will be selected by the tuned circuit 231, which is tuned to the low frequency of the tone source 213 or the tuned circuit 230 which is tuned to the high frequency of the tone source 215. This energy will then pass to the rectifier 227 where it will be rectified and will then pass through the upper or lower armature winding of the relay 232 in the direction of the arrow 235 or the arrow 236 depending on whether the high or the low frequency is being received. This will cause the armature to move to the right or left, thus throwing the switch 220 to the right or left.

It is thus seen that as the frequency changes the relay 232 will change the position of the reversing switch 220 so as to reverse the correlation between the relay 186 and the tone sources 196 and 197.

The depressing of the key 211 can be made to cause the tone produced by the source 196 to be heard in the head phones 195 and the elevating of the key 211 to cause the tone produced by the source 197 to be heard in the head phones 195, as the switch 220 will automatically be reversed whenever the frequency of modulation is changed. The action of the key 211 may be reversed, however, by throwing the reversing switch 182 to the opposite position.

Figure 12:
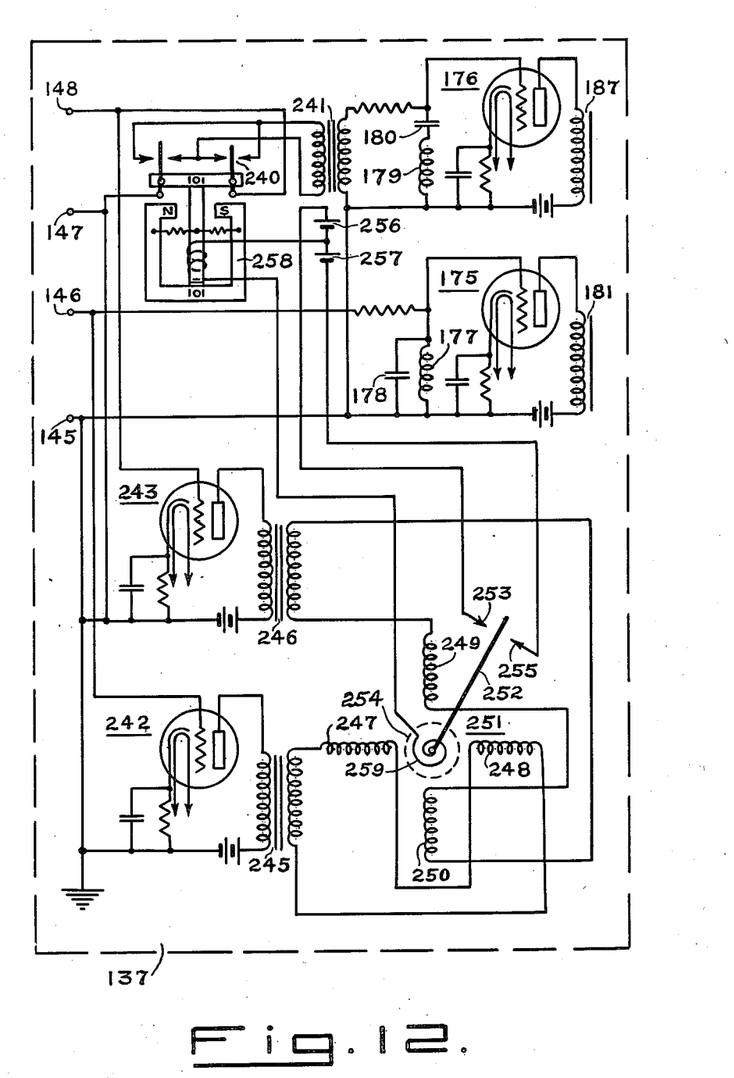
Fig. 12 shows the corresponding receiver having a combining circuit which operates in response to frequency change only.

Fig. 12 illustrates another modification of the signal combining circuit shown in Fig. 9 in which the modulating frequencies and indications in the receiver are properly correlated regardless of the phase shifting used at the transmitter. In this circuit the input terminals 145 and 146 are connected to the phase shifting amplifier 175 and the input terminals 147 and 148 are connected through a reversing switch 240 and a transformer 241 to the phase shifting amplifier 176. The output circuits of the amplifiers 175 and 176 are connected through the transformers 131 and 137 to the phase operated relay 186 and head phones 195 as shown in Fig. 9.

Bridged across the input terminals 145, 146 and 147, 148 are amplifiers 242 and 243 respectively, the output circuits of which are connected through transformers 245 and 246 to two sets of coils 247, 248 and 249, 250 of a torque type phase relay 251 which is provided with an armature 254 to which is attached a contact arm 252. The contact arm 252 cooperates with two contacts 253 and 255 which are connected to the opposite poles of batteries 256 and 257. The other poles of these batteries are connected through the armature winding of a polarized relay 258 to the armature 252 by means of a torque spring 259. The armature of the polarized relay 258 is operatively connected to the reversing switch 240.

In the operation of the modified signal combining circuit 137 depicted in Fig. 12, the signal indicated in the head phones 195 is dependent on the throw of the key 217 regardless of the position of the key 211 which may be used for confusing any unauthorized person trying to listen in. The signals are impressed upon the amplifiers 242 and 243, the outputs passing through the transformers 245 and 246 and the two sets of coils 247, 248 and 249, 250. As the received signals are in phase quadrature the currents through the two sets of coils 247, 248 and 249, 250 will also be in phase quadrature, as in a two phase induction motor. These coils induce energy into the pivoted armature 254 and the reactions between the inducing and the induced currents cause a torque to be produced in the contact arm 252 the direction of which is determined by the relative phases of the currents. If, for example when the key 211 (Fig. 10) is depressed the contact arm 252 moves to the left into engagement with the contact 253, then when the key 211 is elevated the arm 252 will be moved to the right into engagement with the contact 255. When the arm 252 engages the contact 253, current from the battery 256 will flow through the armature winding of the relay 258 in such a direction that the reversing switch 240 will be thrown to the right, for example, and when the contact arm 252 engages the contact 255 current from the battery 257 will flow through the armature winding of the relay 258 in the opposite direction to throw the switch 240 to the left.

It is thus seen that as the phases of the modulation at the transmitter shift due to the operation of the key 211 the circuit from the terminals 147—148 to the transformer 241 will be reversed, so that the relationship of the phases of the signals impressed upon the phase shifting networks of the amplifiers 175 and 176 will be maintained unchanged. The succeeding circuits therefore operate from changes of frequency at the transmitter only.

It is thus seen that in this form of the invention, regardless of the direction in which the relative phases are shifted by the operation of the key 211, the depressing of the key 217 will always cause the tone produced by the source 196 to be heard in the head phones 195 and the elevating of the key 217 will always cause the tone produced by the source 197 to be heard in the head phones 195, because the switch 240 will automatically be reversed whenever the relative phase is shifted.

By use of circuits such as those illustrated in Figs. 11 and 12 it is obvious that the confusion which would exist for an unauthorized observer by the change of frequency relation during phase signaling or the change of phase relation during frequency signaling would automatically be cleared up for the authorized listener. The circuits could be so constructed that the frequency switching of Fig. 11 and the phase switching of Fig. 12 could be combined in one circuit to produce a system which could be used in a plurality of ways without duplication of apparatus.

This type of communication system may be made more complex by modifying the modulation energy on the two channels for signaling by changes of relative strength as well as by change of relative frequency or by change of relative phase with the same frequency.

Figure 13:
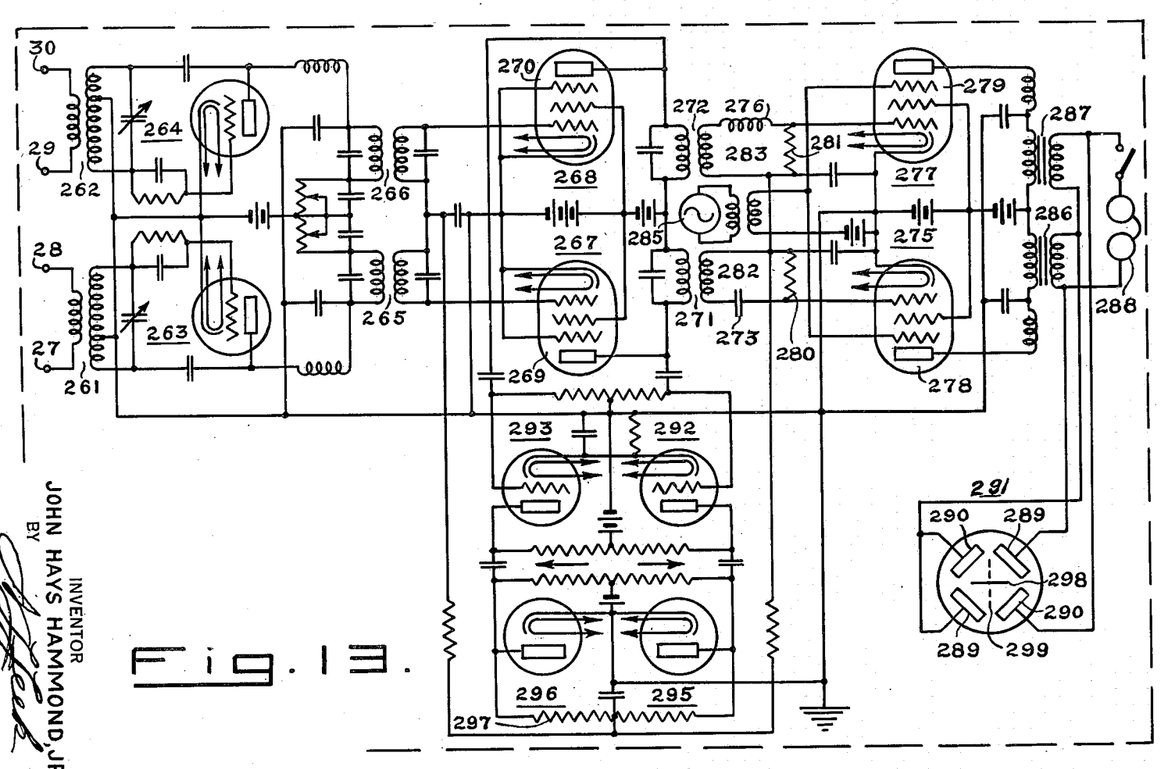
Fig. 13 depicts schematically a complete receiver system especially adapted for signaling by modulating frequencies higher than audio.

Fig. 13 illustrates a complete receiving system adapted for signaling by superaudible modulating frequencies. In this receiver the vertical receiving antenna 21, shown in Fig. 1, is connected to the terminals 27 and 28 and the horizontal receiving antenna 22 is connected to the terminals 29 and 30. The terminals 27, 28 and 29, 30 are connected respectively through transformers 261 and 262 to regenerative detector circuits 263 and 264 which are similar to the circuit shown in Fig. 6. The output circuits of the detectors 263, 264 are connected respectively through superaudible frequency transformers 265 and 266 to the input circuits to amplifiers 267 and 268, which include triple grid tubes 269 and 270.

The output circuits of the amplifiers 267 and 268 include the primaries of transformers 271 and 272 respectively. The secondary of the transformer 271 is connected through a condenser 273 to the input circuit of a detector-amplifier 275 and the secondary of the transformer 272 is connected through an inductor 276 to the input of a second detector-amplifier 277. The detector-amplifiers 275 and 277 are of the heterodyne type and include triple grid tubes 278 and 279 respectively. Connected across the input circuits of the amplifiers 275 and 277 are resistors 280 and 281 respectively, which, with the condenser 273, the inductor 276 and the secondaries of the two transformers 271 and 272, form two oppositely sensed phase shifting circuits 282 and 283. Heterodyning energy may be impressed upon the third grids of the tubes 278 and 279 from an oscillator 285.

The output circuits of the detector-amplifiers 275 and 277 are connected through transformers 266 and 267 to a pair of head phones 288 and also to the two sets of deflection plates 289 and 290 of a kathode ray oscillograph 291. The output circuits of the amplifiers 275 and 277 may also be connected to a phase relay such as that shown in Fig. 8 or that illustrated by the relay 251 in Fig. 12. In the latter case the condenser 273 and the inductor 276 would be shunted out.

Automatic volume control may be provided by connecting the output circuits of the two amplifiers 267 and 268 to amplifiers 292 and 293 respectively. The output circuits of the amplifiers 292 and 293 are connected to two rectifiers 295 and 296 the output circuits of which are connected across a resistor 297. The midpoint of the resistor 297 is connected to the input circuits of both sets of amplifiers 267, 268 and 275, 277. This automatic volume control circuit is well known in the art, the construction and operation of which need not be more fully described herein.

In the operation of the form of the invention shown in Fig. 13 the received signals, which are 90° out of phase in one sense or the other, pass through the detectors 263 and 264 and the amplifiers 267 and 268 to the phase shifting circuits 282 and 283 where the signals are shifted to in-phase or 180° out of phase as the case may be. These signals are then impressed upon the amplifiers 275 and 277 where they are heterodyned with energy from the oscillator 285. As the frequency of both signals is the same and as the same heterodyne frequency is combined with them the detected outputs of the two amplifiers 275 and 277 will be of like frequency and the relative phases of the input intermediate frequencies will be carried through to the detected outputs so that the outputs will be in phase or 180° out of phase. When the outputs are in phase the circuits may be so organized that a horizontal straight trace 298 will be produced on the screen of the kathode ray oscillograph 291 and when the outputs are 180° out of phase a vertical straight trace 299 will be produced.

It is thus seen that when the switch 72 of Fig. 2 is in one position the horizontal trace 298 will be produced and when the switch 72 is in the other position the vertical trace 299 will be produced. These traces may be used for the interpretation of code messages. When the head phones 288 are used, strong or weak signals will be heard therein depending upon the modulation phase relation. In place of the head phones a phase operated relay may be used as described in connection with Figs. 8 and 12.

It is to be understood that when superaudible modulation is used that the system may be designed to operate on a frequency basis as well as a phase basis by the use of more complete networks to replace the reactances 273 and 276.

The circuits shown and described above are, of course, diagrammatic only and it is to be understood that the usual details such as sources of potential, filters, stopping and by-pass condensers, tube element control circuits and the like may be incorporated therein; only so much of the circuits have been described as is necessary to an understanding of the present invention. Furthermore, the invention is not limited to the particular types of tubes shown, the types of tubes, number of stages of amplification, arrangement of detectors, modulators and oscillators being in accordance with standard practice. The systems and details set forth are representative only.

Although the present invention refers to a two channel system with the same carrier on each channel many of the methods employed herein are also applicable to a two channel system with two different carrier frequencies, with the distinction between the two channels made by tuning rather than by the relative phases of polarization.

The essential feature of the systems disclosed in this invention is the simultaneous use of the same modulation frequencies on the two channels with the modulations in substantial phase quadrature. It is evident that stray radiations, static effects, etc., would operate the two channels to a similar degree, but would not operate the circuits which depend upon the modulations being in phase quadrature. If modulated signals are used in an attempt to produce interference, the phases of the demodulated signals at the output of the two radio receivers will be identical, so that when they are shifted to a 90° relationship they will not operate the relays because, being in phase quadrature, they will produce interfering signals in the relay windings. The frequencies of modulation used in the various forms of this invention may be either audible or superaudible.

Although only a few of the various forms in which this invention may be embodied have been shown herein, it is to be understood that the invention is not limited to any specific construction but may be embodied in various forms without departing from the spirit of the invention or the scope of the appended claims.

What is claimed is:

1. The method of signaling which comprises producing a plurality of independently receivable carrier waves having the same frequency, modulating all of said carrier waves by signal waves of the same frequency, and signaling by varying the phase displacement between said signal waves.

2. The method of signaling which comprises producing a plurality of plane polarized radiant energy carrier waves having different planes of polarization, modulating said carrier waves by signal waves of the same frequency and signaling by varying the phase displacement between said signal waves.

3. The method of transmission of intelligence which comprises propagating a pair of independently receivable radiant energy waves, modulating both of said waves with signal waves having the same frequency and in substantial relative phase quadrature, signaling by varying one of the characteristics of the signal waves which characteristics consist of frequency and phase relationship, receiving independently the two waves, demodulating said waves to produce a pair of signals having the same frequency but in phase quadrature, shifting the signal currents to a relative phase angle of zero or 180°, depending upon the signal condition, and actuating a signal responsive device in accordance with the combined effect of said currents.

4. The invention according to claim 3 in which signaling is accomplished by reversing the phase quadrature of the signal waves.

5. The invention set forth in claim 3 in which signaling is accomplished by varying the frequency of the signal waves and shifting the phase of the signal currents at the receiver in a direction dependent upon the frequency change.

6. The invention set forth in claim 3 in which signaling is accomplished by varying one of the characteristics of the signal waves and secrecy is obtained by introducing variations of another characteristic of the signal waves.

7. The invention set forth in claim 3 in which signaling is accomplished by varying the phase quadrature of the signal waves and secrecy is obtained by introducing periodical changes in frequency thereof.

8. The invention set forth in claim 3 in which signaling is accomplished by varying the signal frequency and secrecy is accomplished by masking the frequency variations by changes in phase relationship of the signal waves.

9. A transmitting system comprising means propagating a plurality of plane polarized radiant energy waves, means modulating said waves with signal waves having the same frequency but having different phase relationships, and means for periodically changing said phase relationship for signaling purposes.

10. A transmitting system comprising means propagating a plurality of plane polarized radiant energy waves, means modulating said waves with signal waves having the same frequency but having different phase relationships, and means for periodically changing one of the characteristics of the signal waves for signaling purposes and means periodically changing the other of said characteristics for masking the signal.

11. A receiver responsive to a pair of received radiant energy carrier waves modulated by signals having the same frequency but in phase quadrature, said receiver comprising channels connected to receive and demodulate the respective carriers for producing signal frequency components having frequency and phase relationships corresponding to the original signal waves, means in said channels to shift the phase relationship of said components from quadrature to zero or 180°, depending upon the relationship of the signal waves, a signal responsive device and a circuit actuated by the combined effect of said components for actuating said signal receiving device.

12. A receiver responsive to a pair of received radiant energy carrier waves modulated by signals having the same frequency but in phase quandrature, said receiver comprising channels connected to receive and demodulate the respective carrier waves to produce signal frequency components having phase and frequency characteristics corresponding to the original signal waves, means in said channels to shift the phase relationship of said components from quadrature to zero or 180° when the signals are of a given frequency and to shift the phase relationship in the reverse direction to 180° or zero degrees respectively, when the signals are of a different frequency, a signal responsive device and a combining circuit responsive to changes in the phase relationship of said components for actuating said signal responsive device.

13. The invention set forth in claim 12 in which the phase shifting means comprises differently arranged inductive and capacitive reactance networks in the respective channels adapted to produce a phase shift in one direction when the received frequency is higher and in the other direction when the received frequency is lower than a predetermined frequency.

14. In a receiver as set forth in claim 12, means responsive to frequency changes for reversing the action of said combining circuit whereby the signal responsive device is responsive to phase changes only.

15. In a receiver as set forth in claim 12, means responsive to reverses in phase quadrature for reversing the action of said combining circuit whereby the signal receiving device is responsive only to frequency modulations.

16. A receiver as set forth in claim 12 having means responsive to one of said modulation characteristics for reversing the action of said combining circuit whereby said signal receiving device is responsive only to the other of said characteristics.

17. A receiver as set forth in claim 12 adapted to be actuated by superaudible modulations comprising detectors in said channels to demodulate said carriers and to derive therefrom an intermediate frequency corresponding to the superaudible modulations, and heterodyne means for heterodyning said intermediate frequencies to audible frequencies having the same phase displacement as the original signal waves.

18. A receiver as set forth in claim 12 in which the combining circuit comprises a dynamometer type relay having windings connected to the respective channels and actuated in accordance with the relative phase displacement of the currents therein.

JOHN HAYS HAMMOND, JR.